(12) United States Patent
Baxter et al.

(10) Patent No.: US 12,405,055 B2
(45) Date of Patent: *Sep. 2, 2025

(54) COMPONENT SEPARATIONS

(71) Applicant: Sustainable Energy Solutions, Inc., Provo, UT (US)

(72) Inventors: Larry Baxter, Orem, UT (US); Stephanie Burt, Provo, UT (US)

(73) Assignee: Sustainable Energy Solutions, Inc., Orem, UT (US)

(*) Notice: Subject to any disclaimer, the term of this patent is extended or adjusted under 35 U.S.C. 154(b) by 1000 days.

This patent is subject to a terminal disclaimer.

(21) Appl. No.: 16/374,737

(22) Filed: Apr. 3, 2019

(65) Prior Publication Data

US 2020/0318900 A1 Oct. 8, 2020

(51) Int. Cl.
*F25J 3/06* (2006.01)
*B01D 1/28* (2006.01)
*B01D 5/00* (2006.01)

(52) U.S. Cl.
CPC .............. *F25J 3/0615* (2013.01); *B01D 1/28* (2013.01); *B01D 5/006* (2013.01); *F25J 2205/10* (2013.01); *F25J 2205/20* (2013.01); *F25J 2220/66* (2013.01)

(58) Field of Classification Search
CPC .... F25J 3/0615; F25J 2205/10; F25J 2205/20; F25J 2220/66; F25J 3/0635; F25J 3/067; F25J 3/061; F25J 2210/04; F25J 2230/08; F25J 2230/60; F25J 2235/80; F25J 2245/02; B01D 1/28; B01D 5/006; B01D 1/18; C10L 2290/06; C10L 2290/543; C10L 3/102; C10L 3/103; C10L 3/104; C10L 3/105; Y02C 20/40

See application file for complete search history.

(56) References Cited

U.S. PATENT DOCUMENTS

| 3,376,709 | A | * | 4/1968 | Dickey | C07C 7/14 |
| | | | | | 62/929 |
| 3,398,544 | A | * | 8/1968 | Crownover | F25J 3/061 |
| | | | | | 62/929 |
| 4,318,715 | A | * | 3/1982 | Chou | B01D 53/1425 |
| | | | | | 95/247 |
| 9,683,777 | B2 | * | 6/2017 | Moorkanikkara | F25J 3/0238 |
| 2007/0227186 | A1 | * | 10/2007 | Alferov | B01D 5/0033 |
| | | | | | 62/620 |
| 2008/0307827 | A1 | * | 12/2008 | Hino | F25J 3/064 |
| | | | | | 62/634 |
| 2010/0186446 | A1 | * | 7/2010 | Turner | F25J 1/0245 |
| | | | | | 62/611 |
| 2013/0192465 | A1 | * | 8/2013 | Trofimuk | B01D 53/1425 |
| | | | | | 95/179 |
| 2020/0148963 | A1 | * | 5/2020 | Wormser | C10J 3/12 |

* cited by examiner

*Primary Examiner* — Miguel A Diaz
*Assistant Examiner* — Ibrahim A. Michael Adeniji
(74) *Attorney, Agent, or Firm* — Cook Alex Ltd.

(57) ABSTRACT

Methods and systems for separating components are disclosed. A process liquid stream is provided that contains a first component and a second component. The process liquid stream is cooled to near a temperature at which the second component forms a solid. The process liquid stream is expanded into a vessel such that the first component and a first portion of the second component vaporize to form a process vapor stream and a second portion of the second component forms a solid to form a solid product stream. The process vapor stream and the solid product stream are passed out of the vessel.

8 Claims, 6 Drawing Sheets

401
Cool a process liquid stream, containing a first and second component, to near the temperature at which the second component freezes.

402
Expand the process liquid stream into a vessel such that the first component and a first portion of the second component vaporize to form a process vapor stream and a second portion of the second component freezes to form a solid product stream.

403
Pass the process vapor stream out of the vessel.

404
Pass the solid product stream out of the vessel.

501
Cool a supercritical process fluid stream across a first ICHE, producing a process liquid stream.

502
Pass a process liquid stream and a recirculating stream into a mixer to form a diluted process liquid stream.

503
Expand the diluted process liquid stream into a vessel such that the first component and a first portion of the second component vaporize to form a process vapor stream and a second portion of the second component freezes to form a solid product stream.

504
Pass the process vapor stream and the solid product stream out of the vessel.

505
Compress the process vapor stream across a compressor to form a primary product liquid stream.

506
Split the primary product liquid stream into the recirculating stream and a final primary product liquid stream.

507
Warm the final primary product liquid stream across the first ICHE.

508
Melt the solid product stream across a second ICHE to form a secondary product liquid stream.

509
Warm the secondary product liquid stream across the first ICHE.

FIG. 5B

COMPONENT SEPARATIONS

GOVERNMENT INTEREST STATEMENT

This invention was made with government support under DE-FE0028697 awarded by the Department of Energy. The government has certain rights in the invention.

TECHNICAL FIELD

The methods and processes described herein relate generally to separation of components.

BACKGROUND

Distillation, absorption, membranes, and most other traditional separation processes increase fluid purity using differences in fluid-phase properties. However, all species generally remain at some concentration in all phases or streams. In some cases, one or more chemical species exhibits phase behavior to the exclusion of all other species. The most common example of this is solids formation. It is common that solids contain a single species that is thermodynamically pure, to the exclusion of all other species. In practice, other species generally remain as contaminants, but this is because of an inability to completely separate the solid from the other phases, not because more than one species is in the solid.

SUMMARY

In a first aspect, the disclosure provides a method for separating components. A process liquid stream, containing a first component and a second component, is cooled to near a temperature at which the second component forms a solid. The process liquid stream is expanded into a vessel such that the first component and a first portion of the second component vaporize to form a process vapor stream and a second portion of the second component forms a solid to form a solid product stream. The process vapor stream is passed out of the vessel. The solid product stream is passed out of the vessel.

In a second aspect, the disclosure provides a system for separating components. A first indirect-contact heat exchanger is configured to cool a process liquid stream, consisting of a first component and a second component, to near a temperature at which the second component forms a solid. A vessel is configured to receive and expand the process liquid stream such that the first component and a first portion of the second component vaporize to form a process vapor stream and a second portion of the second component forms a solid to form a first solid product stream. The vessel is further configured to pass the first solid product stream and the process vapor stream out of the vessel.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "C5 hydrocarbons" refers to hydrocarbons containing five carbon atoms. As used herein, "C6+ hydrocarbons" refers to hydrocarbons containing six or more carbon atoms.

Separations of liquid components is a challenge faced by most industries. Distillation, crystallization, and other techniques are often expensive, energy intensive, and complex.

The present invention is able to separate liquid components in a simple, thermodynamically efficient manner. The methods and systems described will work for any combination of components where the first component is a compound or combination of compounds that vaporizes while the second component at least partially forms a solid during expansion of the liquid mixture. Expanding the mixture through a valve or into a vessel, such as a drum, a cyclone, or other expansion chambers, accomplishes the separation of liquid components simply and efficiently. Further, there is no heat transfer required through the valve or vessel.

In a preferred embodiment, the phrase "near a temperature at which the second component forms a solid" means the temperature is between 0° C. and 5° C. above the freezing point of the second component under the mixture conditions. In a more preferred embodiment, the phrase "near a temperature at which the second component forms a solid" means the temperature is between 0° C. and 2° C. above the freezing point of the second component under the mixture conditions. In a most preferred embodiment, the phrase "near a temperature at which the second component forms a solid" means the temperature is between 0° C. and 1° C. above the freezing point of the second component under the mixture conditions.

Figure 1:
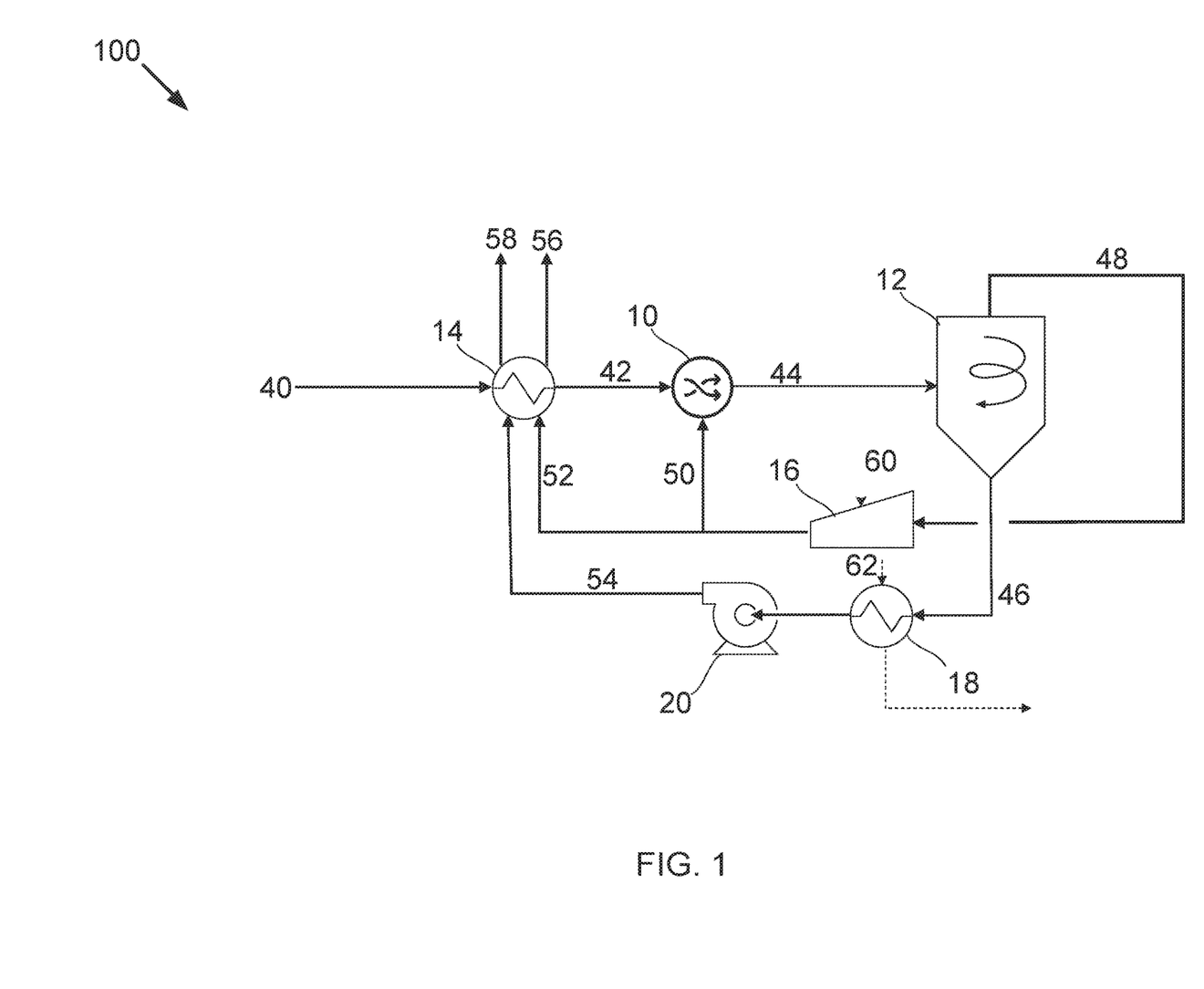
FIG. 1 is a process flow diagram showing a method for separating components that may be used in one embodiment of the present invention.

Now referring to FIG. 1, FIG. 1 is a process flow diagram showing a method 100 for separating components that may be used in one embodiment of the present invention. In this preferred embodiment, a process fluid stream 40 is provided as a supercritical mixture of 30 wt % methane and 70 wt % carbon dioxide at about 60° C. and about 92 bar. The process fluid stream 40 passes through a first exchanger 14 where it is cooled isobarically to about −57° C. The resulting process liquid stream 42 has transitioned from a supercritical fluid to a liquid. The process liquid stream 42 is passed into a mixer 10 where it is mixed with a natural gas stream 50 at −75° C. The mixed liquid stream 44 has a carbon dioxide content between 20 and 30 wt % such that the freezing point of the carbon dioxide is depressed from about −60° C. before mixing to about −70° C. after mixing. In this embodiment, the mixed liquid stream 44 is therefore cooled by a combination of heat exchange and by mixing with a cold dilution stream to near the temperature at which the second component (carbon dioxide) forms a solid. The mixed liquid stream 44 is passed into a cyclone 12. Entry into the cyclone 12 decreases the pressure of the mixed liquid stream 44 to about 6-10 bar, a point at which the methane flashes to form a first vapor stream 48 and remains in the vapor phase at the resultant temperature of −100° C. As the mixed liquid stream 44 changes phase, the first vapor stream 48 absorbs energy and the carbon dioxide substantially cools and forms a solid at −100° C. and 10 bar as a solid product stream 46. The process vapor stream 48 includes some of the $CO_2$ and essentially all of the methane and other light gases and the solid product stream 46 are subsequently passed out of the cyclone 12.

The first vapor stream 48 is compressed by a cooled compressor 16 to −75° C. and 92 bar to form a liquid stream 50 and 52. The liquid stream 50 and 52 is split by a splitter into a recycle stream 50 and a liquid product stream 52. The first liquid product stream is warmed across the first heat exchanger 14 to precool the process fluid stream 40, leaving as a first product stream 56. The second stream 50 recirculates into the process stream to increase the volatile component of stream 44 (methane and other gases) sufficiently that their vaporization in the vessel 12 converts a desired fraction of the $CO_2$ in stream 44 to a solid.

The solid product stream 46 is warmed and melted against refrigerant 62 in a second exchanger 18 and pressurized in a pump 20, resulting in a liquid product stream 54 at about −57° C. and at least 70 bar, more preferably 100 bar, most preferably 150 bar. The liquid product stream 54 is then warmed across the first exchanger 14, providing cooling for the incoming process fluid stream 40.

Figure 2:
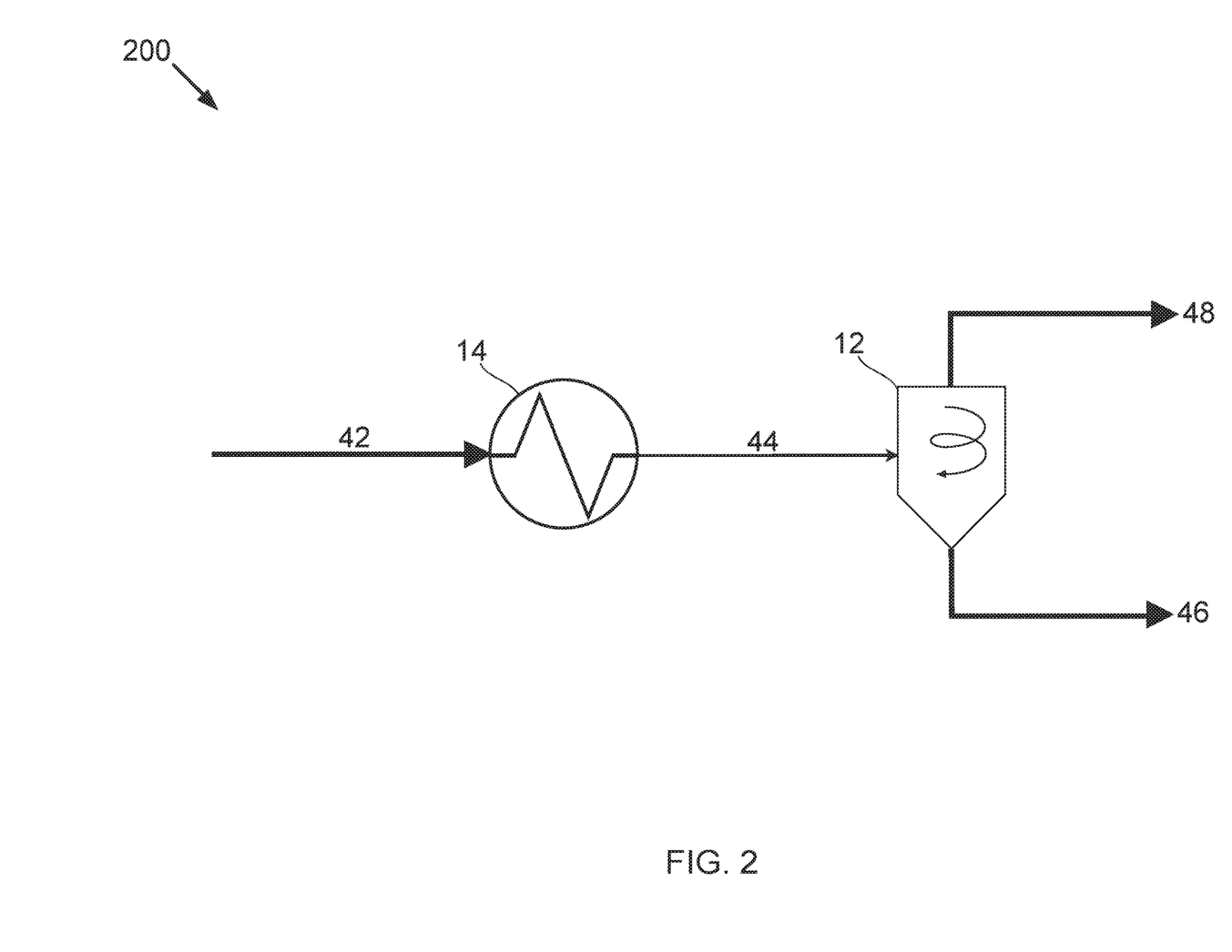
FIG. 2 is a process flow diagram showing a method for separating components that may be used in one embodiment of the present invention.

Now referring to FIG. 2, FIG. 2 is a process flow diagram showing a method 200 for separating components that may be used in one embodiment of the present invention. A process liquid stream 42, consisting of a first component and a second component, is cooled across an exchanger 14 to near a temperature at which the second component forms a solid. The cooled liquid stream 44 is passed into a cyclone 12 operating at lower pressure than stream 44. Passage into the cyclone 12 decreases the pressure of the cooled liquid stream 44 to a point at which substantially all of the first component flashes to form a first vapor stream 48 and remains in the vapor phase at the resultant temperature. As the mixed liquid stream 44 partially vaporizes, the first vapor stream 48 absorbs energy and the second component is cooled and subsequently forms a solid as a solid product stream 46. The process vapor stream 48 and the solid product stream 46 are subsequently passed out of the cyclone 12.

Figure 3:
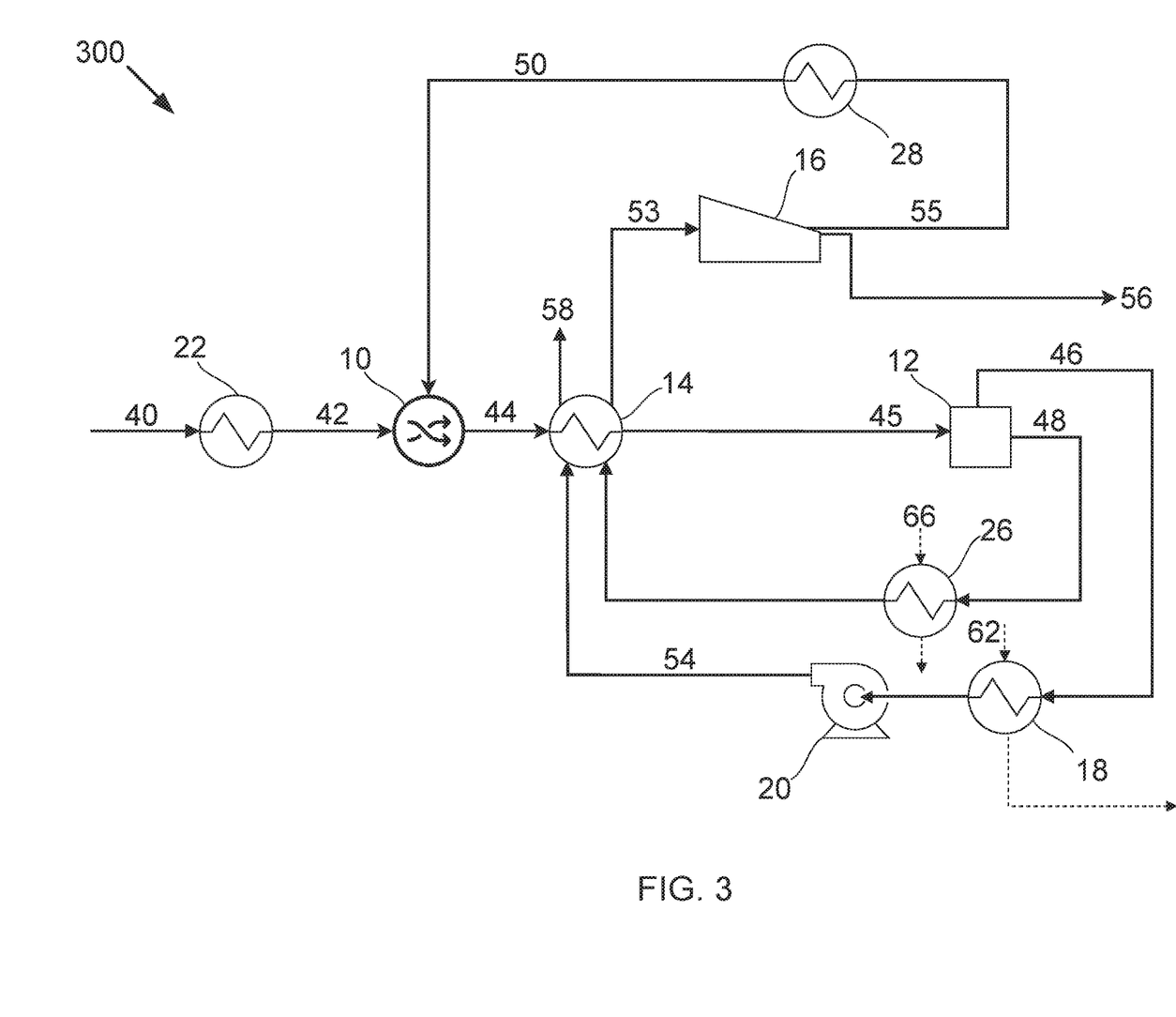
FIG. 3 is a process flow diagram showing a method for separating components that may be used in one embodiment of the present invention.

Now referring to FIG. 3, FIG. 3 is a process flow diagram showing a method 300 for separating components that may be used in one embodiment of the present invention. In this embodiment, a process fluid stream 40 is provided as a supercritical mixture of 30 wt % methane and 70 wt % carbon dioxide at about 60° C. and about 92 bar. The process fluid stream 40 passes through a first exchanger 22 where it is cooled isobarically to about 20° C., resulting in a second process fluid stream 42. The second process fluid stream 42 is mixed with a liquid stream 50 at 20° C. and that contains light components that vaporize at the conditions of vessel 12, resulting in a mixed process stream 44. The mixed liquid stream 44 has a carbon dioxide content between 10 and 40 wt % such that the freezing point of the carbon dioxide is depressed from about −60° C. before mixing to about −70° C. after mixing. The mixed process stream is cooled isobarically across a second exchanger 14 to just above the temperature at which solids form, −70° C., resulting in a mixed liquid stream 45 near but still above the freezing point of carbon dioxide. The mixed liquid stream 45 is passed into a drum 12. Passage into the drum 12 decreases the pressure of the mixed liquid stream 45 to about 10 bar, a point at which substantially all of the methane flashes to form a first vapor stream 48 and remains in the vapor phase at the resultant temperature of −100° C. As the mixed liquid stream 45 changes phase, the first vapor stream 48 absorbs energy and the carbon dioxide is cooled and subsequently forms a solid at −100° C. and 10 bar as a solid product stream 46. The process vapor stream 48 and the solid product stream 46 are subsequently passed out of the drum 12.

The first vapor stream 48 is warmed by a refrigerant 66 across a third exchanger 26 and the second exchanger 14, resulting in a first warmed vapor stream 53 at about 20° C. This vapor stream 53 is compressed across a compressor 16 from 10 bar to at least a pressure that will render it a liquid at the temperature of stream 50. A portion 55 of the resultant liquid is cooled to 20° C. by heat exchanger 28 and becomes the liquid methane stream 50. The remaining portion of the resultant liquid is a first liquid product stream 56.

The solid product stream 46 is warmed and melted against refrigerant 62 in a fourth exchanger 18 and pressurized in a pump 20, resulting in a liquid product stream 54 at −57° C.

and at least 70 bar, more preferably 100 bar, most preferably 150 bar. The liquid product stream 54 is then warmed across the first exchanger 14, providing cooling for the incoming process fluid stream 40.

Figure 4:
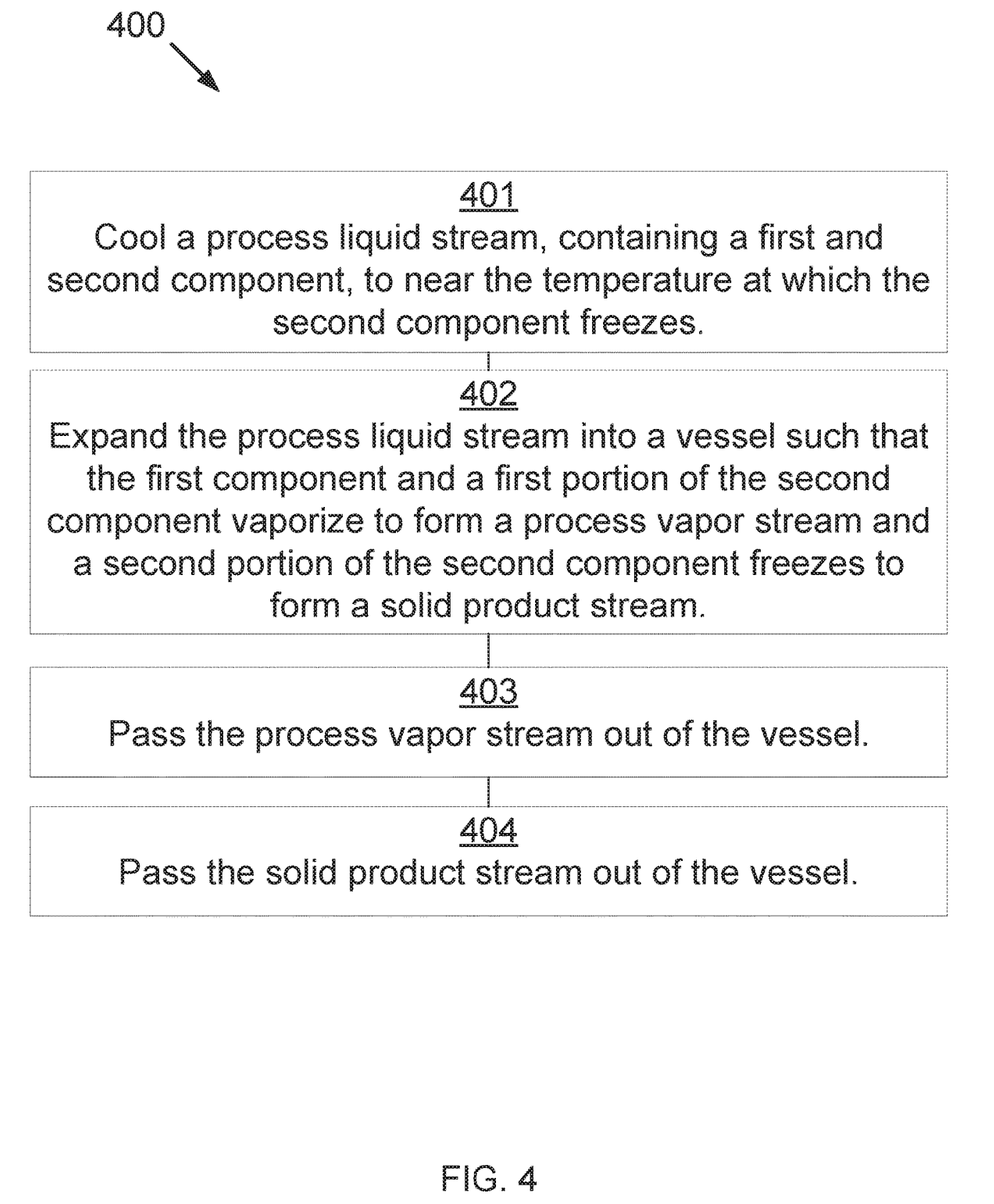
FIG. 4 is a block diagram showing a method for separating components that may be used in one embodiment of the present invention.

Now referring to FIG. 4, a block diagram showing a method 400 for separating components is disclosed as per one embodiment of the present invention. At 401, a process liquid stream, containing a first component and a second component, is cooled to near a temperature at which the second component forms a solid. At 402, the process liquid stream is expanded into a vessel such that the first component and a first portion of the second component vaporize to form a process vapor stream and a second portion of the second component forms a solid to form a solid product stream. At 403, the process vapor stream is passed out of the vessel. At 404, the solid product stream is passed out of the vessel.

Depending on conditions, some liquid may also form during expansion and either exit with the solid phase or as a separate stream.

Figure 5A:
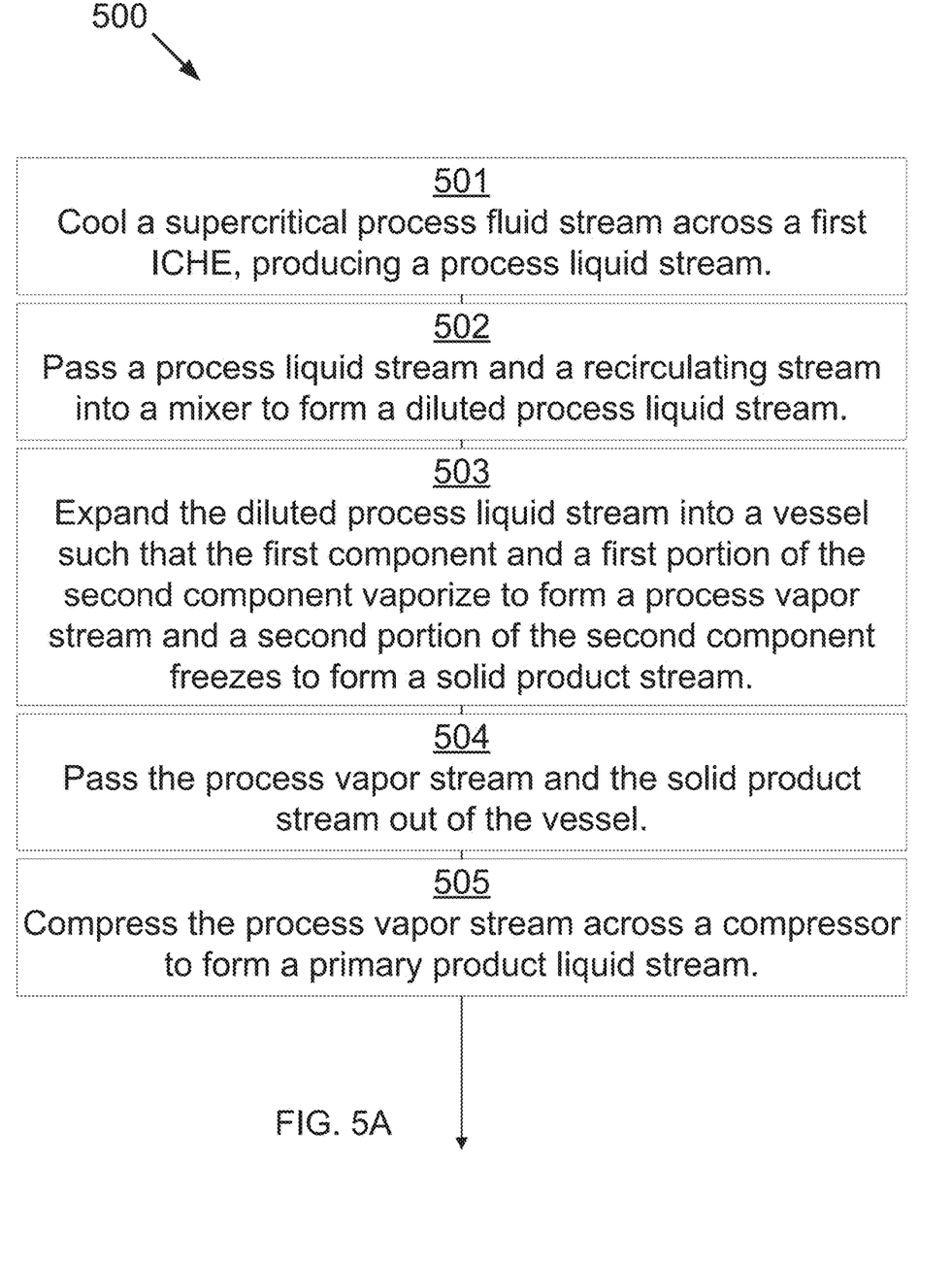
FIG. 5A is a block diagram showing a first set of steps of a method for separating components that may be used in one embodiment of the present invention.
Figure 5B:
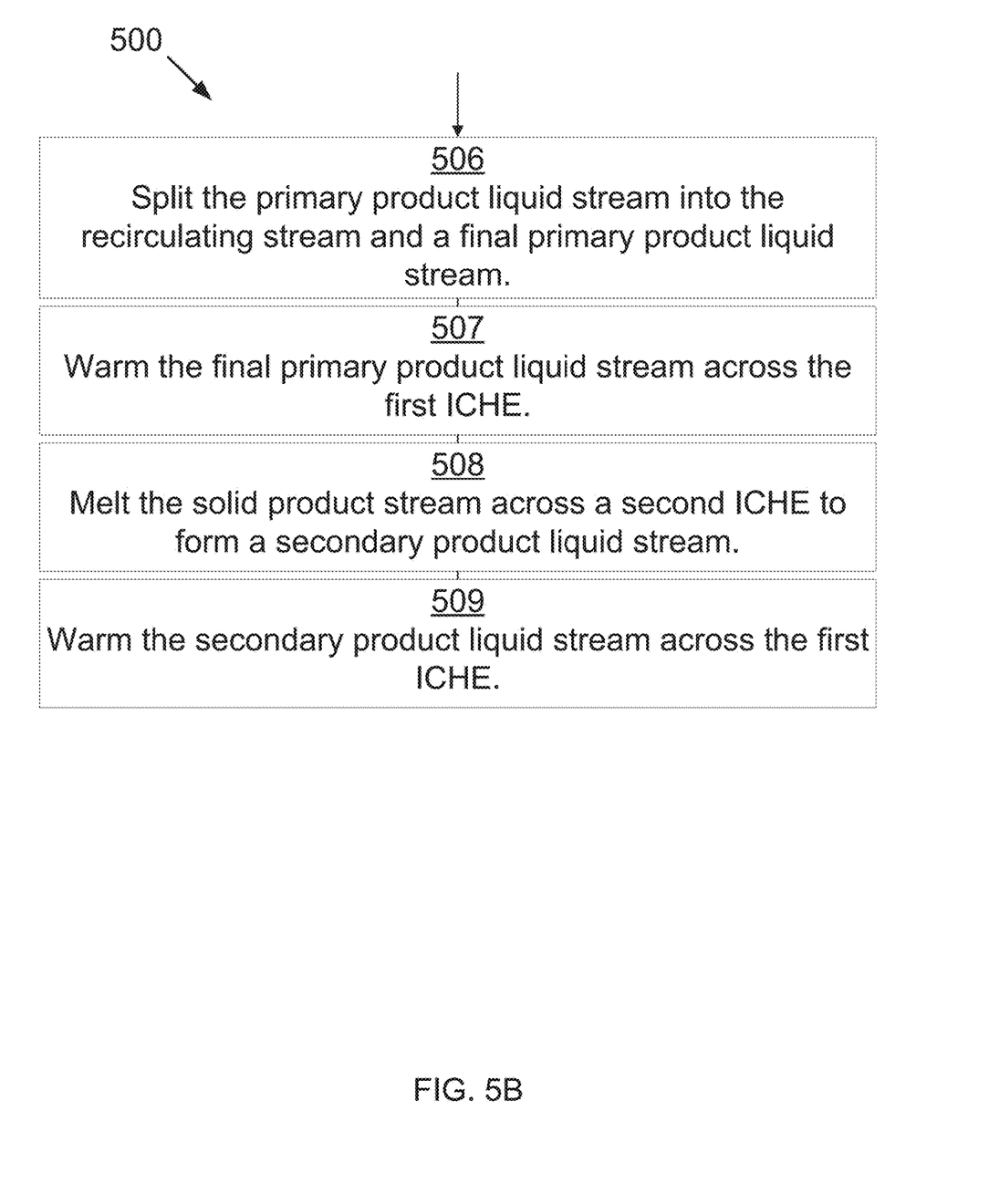
FIG. 5B is a block diagram showing a second set of steps of the method for separating components that may be used in the embodiment of the present invention of FIG. 5A.

Now referring to FIG. 5A and FIG. 5B, a block diagram showing a method 500 for separating components is disclosed as per one embodiment of the present invention. At 501, a supercritical process fluid stream is cooled across a first exchanger, producing a process liquid stream. The supercritical process fluid stream contains a first component and a second component. At 502, the process liquid stream and a recirculating stream are passed into a mixer to form a diluted process liquid stream near the temperature at which the second component forms a solid. The recirculating stream consists of the first component. At 503, the diluted process liquid stream is expanded into a vessel such that the first component and a first portion of the second component vaporize to form a process vapor stream and a second portion of the second component forms a solid to form a solid product stream. At 504, the solid product stream and the process vapor stream pass out of the vessel. At 505, the process vapor stream is compressed across a compressor and heat exchanger to form a primary product liquid stream. At 506, the primary product liquid stream is split into the recirculating stream and a final primary product liquid stream. Any non-condensable gases, such as N2, O2, and Argon, would be removed at this stage. At 507, the final primary product liquid stream is warmed across the first exchanger. At 508, the solid product stream is melted across a second exchanger to form a secondary product liquid stream. At 509, the secondary product liquid stream is warmed across the first exchanger.

In some embodiments, the first component consists of a hydrocarbon selected from the group consisting of methane, ethane, propane, isobutane, n-butane, C5 hydrocarbons, C6+ hydrocarbons, and combinations thereof. In some embodiments, the first component contains water. In some embodiments, the second component consists of an acid gas selected from the group consisting of carbon dioxide, sulfur oxides, nitrogen oxides, carbon monoxide, and combinations thereof.

In some embodiments, the vessel is selected from the group consisting of flash drum, an expansion chamber, a cyclone, and combinations thereof.

In some embodiments, when the process liquid stream is expanded into a vessel, a first portion of the first component and a first portion of the second component vaporize to form a process vapor stream, a second portion of the second component forms a solid to form a solid product stream, and a second portion of the first component and a third portion of the second component remain as a carrier liquid stream.

The solid product stream is entrained in the carrier liquid stream, resulting in a slurry stream. The process vapor stream is passed out of the vessel and the slurry stream is passed out of the vessel. In some embodiments, the slurry stream is expanded into a second vessel. The first component in the carrier liquid stream vaporizes to form a second process vapor stream. The second component in the carrier liquid stream forms a second solid product stream. The second process vapor stream is passed out of the second vessel and the solid product stream and the second solid product stream are passed out of the second vessel.

The invention has been described with reference to various specific and preferred embodiments and techniques. Nevertheless, it is understood that many variations and modifications may be made while remaining within the spirit and scope of the invention.

What is claimed is:

1. A method for separating components in a system comprising the steps of:
    cooling a process stream, comprising a first component and a second component, to above a temperature at which the second component forms a solid so that a cooled process liquid stream that is purely liquid is formed, said cooling performed by warming a first liquid product stream in a first indirect-contact heat exchanger to form a warmed first liquid product stream and a secondary product liquid stream to form a warmed secondary product liquid stream and diluting the process stream using a recirculating stream in a mixer that is downstream from the first indirect-contact heat exchanger with respect to the process stream;
    expanding the cooled process liquid stream in a single vessel such that the pressure of the cooled process liquid stream is decreased sufficiently to cause the first component and a first portion of the second component to flash and vaporize to form a process vapor stream in the single vessel and absorb energy from a second portion of the second component during the phase change of the first component and the first portion of the second component so that the second portion of the second component forms a solid to form a solid product stream in the single vessel;
    passing the process vapor stream out of the single vessel;
    passing the solid product stream out of the single vessel;
    compressing the process vapor stream across a compressor and a heat exchanger to form a primary product liquid stream;
    splitting the primary product liquid stream exiting the compressor into the first liquid product stream and the recirculating stream, where the recirculating stream includes a portion of the first component;
    directing the warmed first liquid product stream from the first indirect-contact heat exchanger out of the system;
    melting the solid product stream across a second indirect-contact heat exchanger to form the secondary product liquid stream;
    directing the warmed secondary product liquid stream out of the system.

2. The invention of claim 1, wherein the first component comprises a hydrocarbon selected from the group consisting of methane, ethane, propane, isobutane, n-butane, C5 hydrocarbons, C6+ hydrocarbons, nitrogen, helium, and combinations thereof.

3. The invention of claim 2, wherein the second component comprises an acid gas selected from the group consisting of carbon dioxide, sulfur oxides, nitrogen oxides, carbon monoxide, and combinations thereof.

4. The invention of claim 1, wherein the step of warming the secondary product liquid stream against the process fluid stream includes warming the secondary product liquid stream across the first indirect-contact heat exchanger against the process fluid stream.

5. The invention of claim 1, wherein the single vessel is selected from the group consisting of a valve, a flash drum, an expansion chamber, and a cyclone.

6. A method for separating components in a system comprising the steps of:
   cooling a process stream, comprising a first component and a second component, to above a temperature at which the second component forms a solid so that a cooled process liquid stream that is purely liquid is formed, said cooling performed by warming a first liquid product stream in a first indirect-contact heat exchanger to form a warmed first liquid product stream and a secondary product liquid stream to form a warmed secondary product liquid stream and by diluting the process stream using a recirculating stream in a mixer that is downstream from the first indirect-contact heat exchanger with respect to the process stream;
   expanding the cooled process liquid stream in a single vessel such that the pressure of the cooled process liquid stream is decreased sufficiently to cause a first portion of the first component and a first portion of the second component to flash and vaporize to form a process vapor stream in the single vessel and absorb energy from a second portion of the second component during the phase change of the first portion of the first component and the first portion of the second component so that the second portion of the second component forms a solid to form a solid product stream in the single vessel, and a second portion of the first component and a third portion of the second component remain as a carrier liquid stream, the solid product stream entraining in the carrier liquid stream, resulting in a slurry stream;
   passing the process vapor stream out of the single vessel;
   passing the slurry stream out of the single vessel;
   compressing the process vapor stream across a compressor and a heat exchanger to form a primary product liquid stream;
   splitting the primary product liquid stream exiting the compressor into the first liquid product stream and a recirculating stream, where the recirculating stream includes a portion of the first component;
   directing the warmed first liquid product stream from the first-indirect contact heat exchanger out of the system;
   melting the slurry stream across a second indirect-contact heat exchanger to form the secondary product liquid stream;
   directing the warmed secondary product liquid stream out of the system.

7. The invention of claim 6, further comprising expanding the slurry stream into a second vessel, such that the first component in the carrier liquid stream vaporizes to form a second process vapor stream and the second component in the carrier liquid stream forms a second solid product stream, passing the second process vapor stream out of the second vessel and passing the solid product stream and the second solid product stream out of the second vessel.

8. The invention of claim 6, wherein the step of warming the secondary product liquid stream against the process fluid stream includes warming the secondary product liquid stream across the first indirect-contact heat exchanger against the process fluid stream.

\* \* \* \* \*